(12) United States Patent
Krzesicki et al.

(10) Patent No.: US 6,454,674 B1
(45) Date of Patent: Sep. 24, 2002

(54) CONTROLLABLE TORQUE TRANSFER DIFFERENTIAL MECHANISM USING MAGNETORHEOLOGICAL FLUID

(75) Inventors: Richard M. Krzesicki, St. Clair Shores, MI (US); Stanley L. Seely, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 23 days.

(21) Appl. No.: 09/791,478

(22) Filed: Feb. 23, 2001

(51) Int. Cl.[7] ............................................... F16H 48/26
(52) U.S. Cl. ......................................... 475/85; 475/231
(58) Field of Search ............................... 475/84–90, 231

(56) References Cited

U.S. PATENT DOCUMENTS 5,779,013 A   7/1998   Bansbach

Primary Examiner—Sherry Estremsky
Assistant Examiner—Dennis Abdelnour
(74) Attorney, Agent, or Firm—John E. Kajander, Esq.

(57) ABSTRACT

A method of controlling torque transfer from a torque input source to an outlet source in which an electronically controllable magnetorheological fluid-based torque limiting device is coupled to either a differential pinion gear, a side gear, both the differential pinion gear and side gear, or both side gears of a differential assembly. By introducing current through electronically controllable magnetorheological fluid-based torque-limiting device during a turning or spin-out condition, and thereby increasing the viscosity of the magnetorheological fluid within the torque limiting device, the amount of torque that is transferred to the output source through the differential assembly can be controlled.

17 Claims, 3 Drawing Sheets

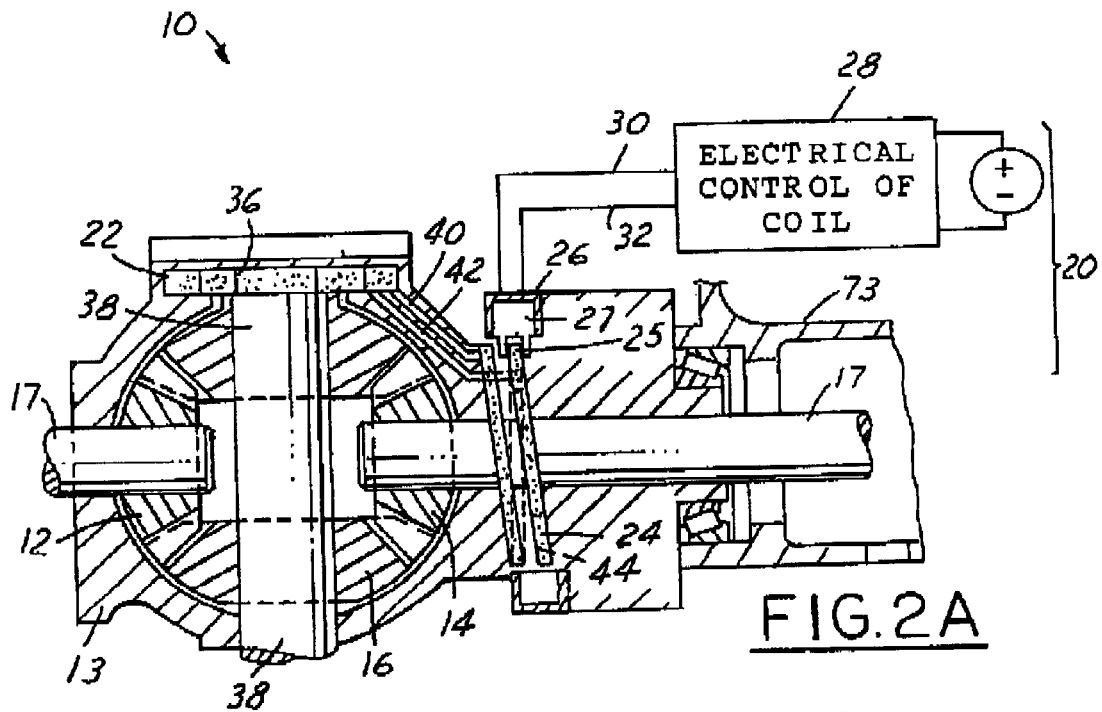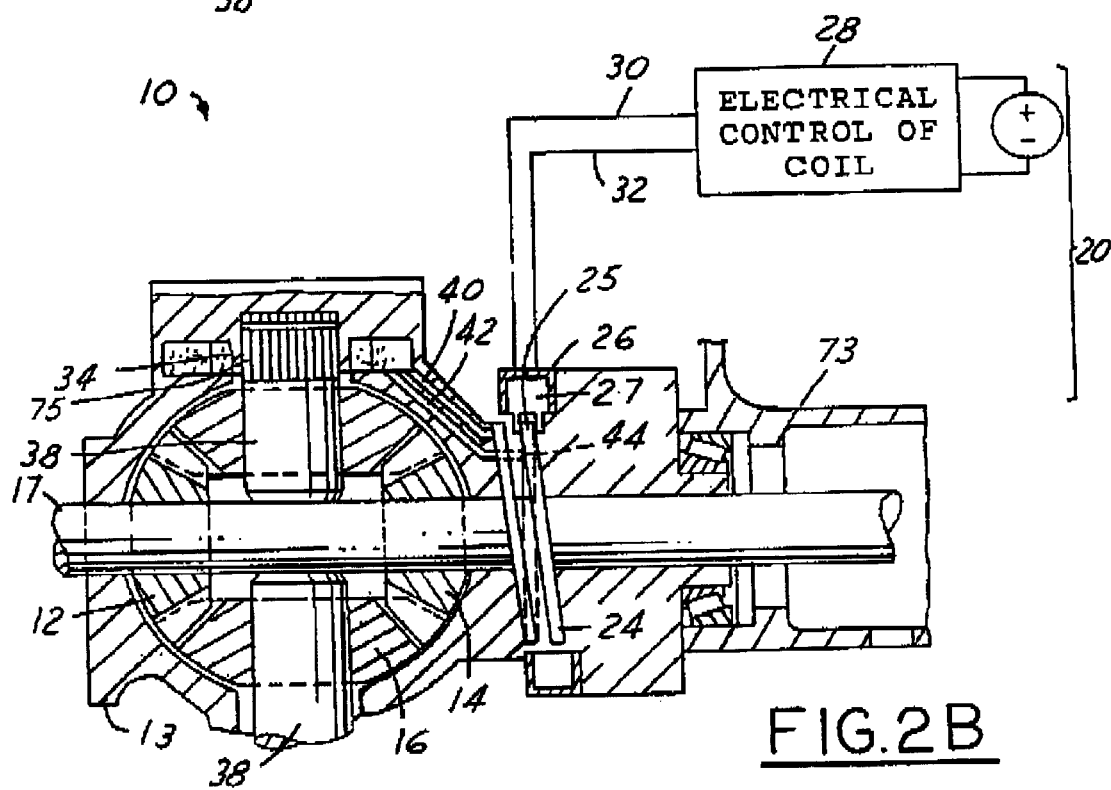

CONTROLLABLE TORQUE TRANSFER DIFFERENTIAL MECHANISM USING MAGNETORHEOLOGICAL FLUID

TECHNICAL FIELD

The present invention relates generally to torque transfer differential systems and more particularly to controllable torque transfer differential mechanisms using magnetorheological fluid.

BACKGROUND

A differential delivering torque to the wheels of a vehicle allows for wheel slippage and over-spin. Essentially through the gearing within a differential assembly, a balance of torque is achieved for both wheels semi-independent of wheel slippage.

Control of torque and wheel spin in a differential mechanism usually takes the form of friction surfaces and clutch engagement packages. However, one drawback of these systems is that they are usually subject to wear out and fatigue.

Another method used is to use an electrically controllable limited slip differential employing a "ball/ramp" torque multiplier device actuated by a solenoid to provide an electromechanical method to achieve desired friction levels. However, these systems can exhibit nonlinear torque transfer upon actuation.

Another method contemplated is to use magnetorheological ("MR") fluid in a differential mechanism or coupler to control torque transfer. These devices focus on the fluidic shear action of the MR fluid in a disc-to-disc coupling device to transfer torque. One problem with these devices is that the abrasive structure of the MR fluid when actuated causes the friction surfaces to wear out and fatigue.

Linear control of torque transfer is highly desirable in a differential assembly to optimize vehicle performance over traction and stability events.

SUMMARY OF THE INVENTION

An object of the present invention is to provide a controllable torque transfer differential mechanism for use in a vehicle.

The above object is accomplished by coupling a closed fluid pump system of magnetorheological fluid to various points on a differential assembly. The pump routes the magnetorheological fluid in a manner for straightforward actuation via a magnetic circuit allowing clear separation of rotating and nonrotating members.

The present invention offers several advantages over previous systems. First, the present invention offers linear control over actuation and corresponding torque transfer. Second, the present invention offers simple differential assembly adaption and a simple electrical actuation method. Third, the present invention requires low power to the actuator. Finally, the present invention offers increased durability over previous MR coupled devices.

Other objects and advantages of the present invention will become apparent upon considering the following detailed description and appended claims, and upon reference to the accompanying drawings.

BRIEF DESCRIPTION OF THE DRAWINGS

FIG. 2A depicts a differential assembly according having a closed fluid pump system coupled to a differential pinion gear according to one preferred embodiment of the present invention;

FIG. 2B depicts a sectional view a portion of FIG. 2A; and

DESCRIPTION OF THE PREFERRED EMBODIMENTS

Figure 1:
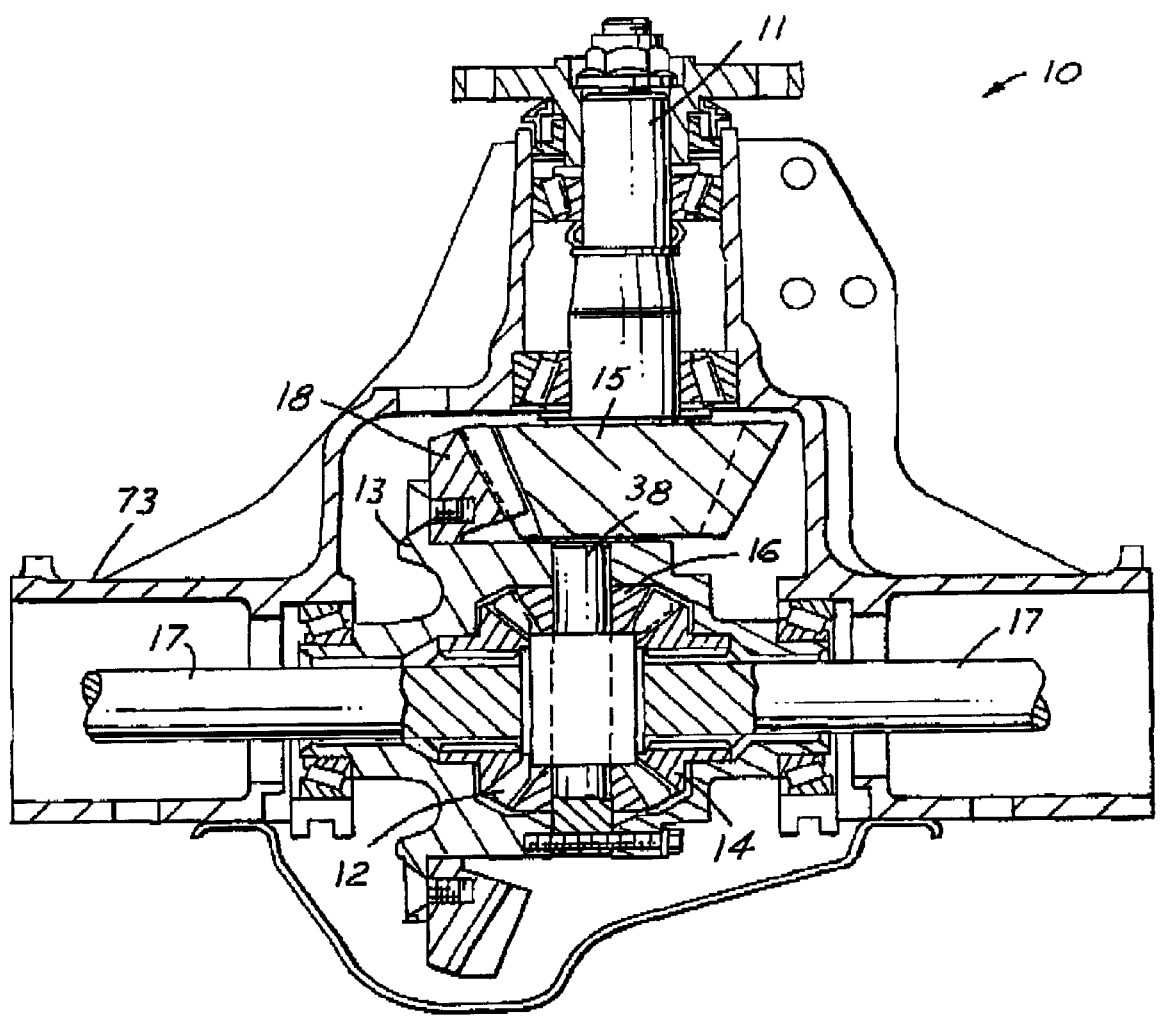
FIG. 1 depicts a differential assembly according to the present art.

Referring now to FIG. 1, a differential assembly is illustrated generally as 10. The differential assembly 10 is a gear system that transfers power from an input source to the wheels. The input source includes a drive shaft 11 coupled to an engine crankshaft (not shown) that is also coupled to a drive pinion gear 15. The drive pinion gear 15 is also coupled with a ring gear 18. The ring gear 18 is typically coupled to the differential casing 13.

A pair of driving axle shafts 17 are coupled between one of a pair of differential side gears 12, 14 and the wheel assembly (not shown). The driving axle shafts 17 are splined to a pair of differential side gears 12, 14 at right angles to the line of drive. The differential 10 uses a differential pinion gear 16 coupled to the ring gear 18 to redirect the transfer of power to the side gears 12, 14, which in turn directs the power to the driving axle shafts 17 and wheels to control a vehicle.

In operation, as power is requested to drive the driving axle shafts 17 of a vehicle, power is transferred from the drive shaft 11 to the drive pinion gear 15, which in turn causes the ring gear 18 and the differential casing 13 attached to it to rotate. The differential casing 13 encloses the differential pinion gears 16 and side gears 12, 14.

In straight-ahead operations, the ring gear 18 and the differential casing 13 rotate as a unit. The differential pinion gears 16 do not turn about their own axes, but apply equal effort to each of the differential side gears 12, 14 and axle shafts.

On turns, the resistance against rotation of one axle shaft 17 increases as the wheels turn at different speeds. This causes the differential pinion gears 16 to turn on their own axes and roll around the differential side gears 12, 14 of the reluctant one of the two axle shafts 17. This allows the reluctant axle shaft 17 to slow down or stand still, causing a corresponding increase in speed of the rotation of the other axle shaft 17. If one axle shaft 17 does not turn at all, the other axle shaft 17 will turn at almost twice the normal speed. It is possible for the drive wheels to turn at different speeds while the same amount of power is applied to them.

FIGS. 2A and 2B show one preferred embodiment of the present invention, in which a magnetorheological-based torque controlling system is coupled within the differential assembly.

Referring now to FIG. 2A, a vane-type fluid pump 22 of a closed magnetorheological fluid pump system 20 is connected with the differential pinion gear 16 to control the torque transfer from the drive shaft 11 to the driving axle shafts 17. The pump system 20 also has a fluid capillary tube 24 in fluid communication with the pump 22, a magnetic circuit 26 coupled to the capillary tube 24, and an electronic control unit 28 coupled to the coil 27 by a pair of connections 30, 32. The fluid capillary tube 24 is made of a non-ferromagnetic material such as a hardened plastic, carbon fiber material, or aluminum.

The magnetic circuit 26 consists of a coil 27 wrapped around a ferromagnetic material (steel) to focus the magnetic flux. Actuation power for the coil 27 is low (in the order of Amperes) and the magnetic flux can be easily increased via more coil turns or wrappings (e.g. Ampere's Circuital Law). The electronic current through the coil 27 is controlled by the electronic control unit 28.

The vane-type fluid pump 22 consists of an inner housing 34 having a plurality of vanes 36 affixed to the differential pinion gear 16. The pump 22 also has a fluid inlet 40 and fluid outlet 42 contained on the differential casing 13 that is affixed to a non-rotating portion. In this respect, the inner housing 34 and vanes 36 rotate in response to the rotation of the differential pinion gear 16, while the differential casing 13 rotates at a speed as a function of the drive pinion gear 15.

Contained within the fluid pump system 20 is a magnetorheological ("MR") fluid 44. The MR fluid 44 is a controllable fluid medium that changes from a free flowing liquid to a semi-solid state when a magnetic field is applied by aligning magnetically polarized particles contained within the MR fluid 44 to form particle chains. This effectively increases the viscosity of the MR fluid 44. When the magnetic field is removed, the MR fluid 44 returns to its original liquid state. Advantageously, the response time for MR fluid 44 to change between a steady-state semi-solid phase to a steady-state fluid (liquid) phase is in the range of a millisecond. Therefore, torque transfer control changes can be performed quickly.

Furthermore, MR fluid 44 can be operated at specific intermediate viscosities between the fluid state and the high-viscosity state by varying the magnetic field applied to the MR fluid 44. Preferably, MR fluid 44 is a mineral-oil based fluid or a silicon-oil based fluid.

Since the inner housing 34 having the vane-type pump 22 and vanes 36 is coupled to the differential pinion gear 16, these components rotate as well, causing MR fluid 44 to flow out of the fluid outlet 42, through the capillary tube 24, and return through the fluid inlet 40 in a closed loop.

During spin-out or turning conditions, the electronic control unit 28 will direct that current be sent through the coil 27. This movement of current through the coil 27 induces a magnetic field within a portion of the capillary tube 24. This magnetic field induces the MR fluid 44 flowing through the portion 25 of the capillary tube 24 to increase viscosity as described above. The capillary tube 24 typically is narrowed within this portion 25. The larger the current flowing through the coil 27, the higher the viscosity of the MR fluid 44 up to an upper limit. This increased viscosity limits the flow rate through the pump 22, thereby decreasing the rotational speed of the pump 22 and the coupled differential pinion gear 16. Essentially, this creates a braking effect that decreases the amount of torque transmitted to the driving axle shafts 17 and to the wheels.

FIG. 2B shows a closeup view of the pump system 20 of FIG. 2A. The inner housing 34 of the pump 22 is affixed to the splined portion 75 of the shaft 38 of the differential pinion gear 16 and rotates to pump fluid through the capillary tubes 24 when the differential pinion gear 16 rotates. The capillary tube 24 is preferably helically wrapped in a screw like fashion around the differential casing 13 covering the splined portion 75 of one of the side gears 12, 14. This ensures proper exposure of the MR fluid 44 flowing through the capillary tube 24 to a magnetic field produced by the coil 27 of the magnetic circuit 26. The magnetic circuit 26 encompasses a portion of the capillary tube 24 and is similarly affixed to the differential housing 73 such that magnetic circuit 26 does not rotate as the differential pinon gear 16 or side gears 12, 14 rotate.

Figure 3:
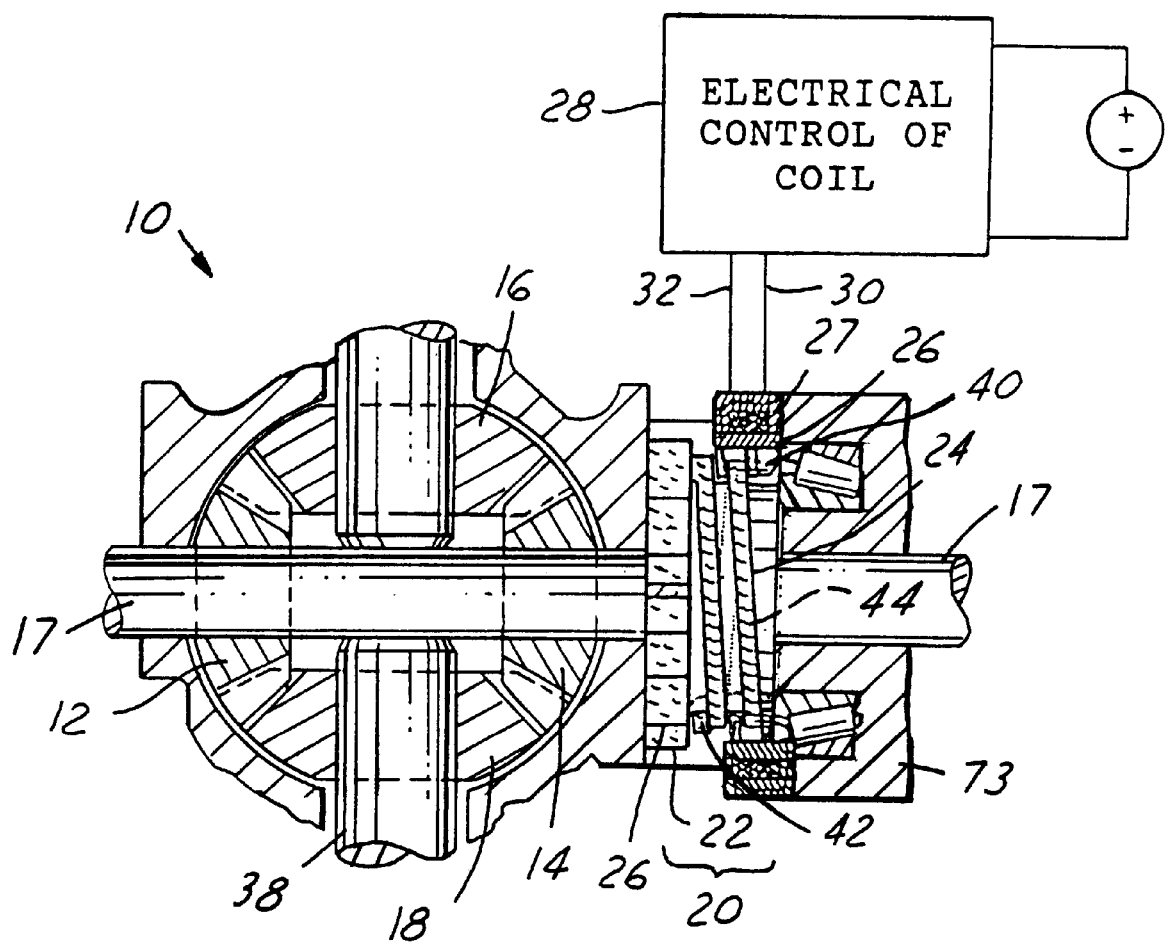
FIG. 3 depicts a differential assembly according having a closed fluid pump system coupled to one of the side gears according to another preferred embodiment of the present invention.

In another preferred embodiment, as depicted in FIG. 3, the vane-type pump 22 of the closed magnetorheological fluid pump system 20 is coupled to the differential casing 13 one of the side gears 12, or side gear 14 (shown here connected to side gear 14). The mechanism for limiting the flow rate of the viscous magnetorheological fluid through the pump 22 is similar to that of FIG. 2A. In these cases, the transmission of torque from the differential pinion gear 16 to the differential side gears 12, 14 create flow of viscous magnetorheological fluid through the closed magnetorheological fluid pump system 20. As current is directed through the coil 27 by the electronic control unit 28, the viscosity of the magnetorheological fluid is increased by changing the phase of the magnetorheological fluid from a liquid phase to a semi-solid phase, which in turn limits the flow rate of the magnetorheological fluid through the pump 22. This in turn limits the rotation of the coupled side gears 12, 14, thereby limiting the torque supplied to the driving axle shafts. As in FIG. 1, the amount of the braking effect is a function of the flow rate of magnetorheological fluid through the vane-type pump 22, which is controlled by the amount of electrical current flowing through the coil 26 as directed by an electronic control unit 28.

The embodiment depicted in FIG. 3 may be preferable to the embodiment depicted in FIGS. 2A and 2B since this embodiment also may help to eliminate potential rotational inertial effects.

Two other preferred embodiments combining the principles as described in FIGS. 2A and 3 are also contemplated within the scope of the present invention. First, it is specifically contemplated that an additional vane-type pump may be added to one of the side gears 12 or 14 in FIG. 2A to provide additional torque control within the closed magnetorheological fluid pump system 20. Second, an additional vane-type pump could be added so that both of the side gears 12, 14 have a coupled pump. These vane-type pumps may be coupled within a single closed loop system or within separate closed loop systems coupled to an electronic control unit 28 and still effectively control the torque transfer from the driving shaft to the driving axle shafts.

While the embodiments as depicted in FIGS. 2A and 3 show a vane-type fluid pump 22, other types and sizes of pumps may be used and still fall within the spirit of this present invention. For example, the pump could be a gear pump such as a gerotor pump or multiple gear pump. Further, the size, number and location of the electrical coils 27 may be varied and still fall within the scope of the present invention.

The present invention offers many advantages over currently available torque limiting systems. First, the durability of the present invention is greater than that of a typical MR fluid-based clutch system. MR fluid abrasion, which affects the durability of a typical MR fluid-based clutch systems, is not a concern in the present invention because the fluid is not being sheared between friction surfaces and clutch engagement packages to create torque. This shearing process creates heat, which degrades the MR fluid, which affects clutch life. Further, the friction surfaces and clutch engagement packages are subject to wear out and fatigue.

Second, the present invention utilizes a linear actuation mechanism to control torque, as compared with typical differential torque limiting mechanisms which employ a "ball/ramp" torque multiplier device actuated by a solenoid to provide an electro-mechanical way to achieve the friction levels desired. Linear control of torque transfer is desirable in a differential assembly to optimize vehicle performance over traction and stability events.

Third, the present invention is easily adapted to differential assemblies. The rotating elements of the pump are simply splined to either the drive pinion gear, the side gears, or a combination of both, while the non-rotating elements are secured to the differential casing without creating packaging problems.

Finally, the present invention requires low input power to actuate the coils to create a magnetic field that is used to convert the MR fluid to a semi-solid state. The requirements for this type of actuation are typically a few Amperes.

While the invention has been described in terms of preferred embodiments, it will be understood, of course, that the invention is not limited thereto since modifications may be made by those skilled in the art, particularly in light of the foregoing teachings.

What is claimed is:

1. A torque transfer control system comprising:

a toque supply source;

a differential coupled to said torque supply source, wherein said differential has a drive pinion gear coupled to said torque supply source, a ring gear coupled to said drive pinion gear, a differential casing coupled to said ring gear, a differential pinion gear coupled to said differential casing, a pair of side gears coupled to said differential pinion gear, and a non-rotating differential housing;

an output source coupled to said differental; and an activatable magnetorheological-based torque limiting device coupled to said differential, wherein said activatable magnetorheological-based torque limiting device comprises a pump having a fluid inlet and a fluid outlet, a capillary tube coupled to said fluid inlet and said fluid outlet, an electrical coil coupled to a portion of said capillary tube, an electronic control unit coupled to said electrical coil, and a quantity of magnetorheological fluid contained within said capillary tube and said pump, wherein said activatable magnetorheological-based torque limiting device limits the transfer of torque from said torque supply source to said output sauce when activated.

2. The torque transfer control system of claim 1, wherein said pump is coupled to a differential pinion gear, wherein a first portion of said pump rotates as said differential pinion gear rotates to cause the movement of said quantity of magnetorheological fluid through said capillary tube and said pump, and wherein a second portion of said pump does not rotate with said differential pinion gear, said second portion containing said fluid inlet and said fluid outlet.

3. The torque transfer control system of claim 1, wherein said pump is coupled to one of said side gears, when a first portion of said pump rotates as said one of said side gears rotates to cause the movement of said quantity of magnetorheological fluid through said capillary tube and said pump, and wherein a second portion of said pump does not rotate with said one of said side gears, said second portion containing said fluid inlet an said fluid outlet.

4. The torque transfer control system of claim 1, wherein said pump is selected from the group consisting of a vane-type pump and a gear pump.

5. A method for controlling torque transfer from a torque supply source to an outlet source in a drive system, the method comprising the steps of:

coupling a differential assembly to the outlet source;

coupling a rotatable portion of said differential assembly to a torque supply source;

coupling a pumping portion of a pump of an electronically controllable magnetorheological fluid-based torque limiting device to said rotatable portion, said pumping portion having a fluid inlet and a fluid outlet, wherein the rotation of said rotatable portion causes a pumping action of a quantity of magnetorheological fluid through said electronically controllable magnetorheological fluid-based torque limiting device at a first flow rate;

electronically activating said electronically controllable magnetorheological fluid-based torque limiting device during a turning condition or to prevent a spin-out condition to change a phase of a quantity of magnetorheological fluid contained within said electronically controllable magetorheological fluid-based torque limiting device from a free flowing liquid to a semi-solid state, wherein said change of phase causes a decrease in the rotational speed of the outlet source relative to the rotational speed of the torque supply source.

6. The method of claim 5, wherein the step of electronically activating said electronically controllable magnetorheological fluid-based torque limiting device comprises the steps of:

electronically actuating an electrical coil contained within said electronically controllable magnetorheological fluid-based torque limiting device to create a magnetic field during a turning or to prevent a spin-out condition, wherein said electrical coil is coupled to a portion of a capillary tube, said capillary tube coupled to said fluid inlet and said fluid outlet; and changing the phase of said quantity of magnetorheological fluid as it is pumped through said portion of said capillary tube from a free flowing liquid to a semi-solid state in response to said magnetic field, wherein said changing of phase to said semi-solid state decreases the flow rate of said quantity of magnetorheological fluid from a first flow rate to a second flow rate, wherein said second flow rate causes a decrease in the rotational speed of said rotatable portion and a decrease in the rotational speed of the outlet source.

7. The method of claim 5, wherein the step of coupling a rotatable potion of a differential assembly to a torque supply source and the step of coupling an electronically controllable magnetorheological fluid-based torque minting device to said differential comprise the steps of:

coupling a drive pinion gear to said torque supply source;

coupling a ring gear to said drive pinion gear;

coupling a differential casing to said ring gear;

coupling a differential pinion gear to said differential casing;

coupling a pair of side gears to said differential pinion gear; and coupling an eleconically controllable magnetorheological fluid-based torque limiting device to said differential pinion gear.

8. The method of claim 5, wherein the step of coupling a rotatable portion of a differential to a torque supply source and the step of coupling an electronically controllable magnetorheological fluid-based torque limiting device to said differential comprises the steps of:

coupling a drive pinion gear to said torque supply source;

coupling a ring gear to said drive pinion gear;

coupling a differential casing to said ring gear;

coupling a differential pinion gear to said differential casing;

coupling a pair of side gears to said differental pinion gear; and coupling an eleconically controllable magnetorheological fluid-based torque limiting device to one of said pair of side gears.

9. The method of claim 5, wherein the step of coupling a rotatable portion of a differential to a torque supply source and the step of coupling an electronically controllable magnetorheological fluid-based torque limiting device to said differential comprises the steps of:

coupling a drive pinion gear to said torque supply source;

coupling a ring gear to said drive pinion gear;

coupling a differential casing to said ring gear;

coupling a differential pinion gear to said differential casing;

coupling a pair of side gears to said differential pinion gear;

coupling a first electronically controllable magnetorheological fluid-based torque limiting device to said differential pinion gear; and coupling a second electronically controllable magnetorheological fluid-based torque limiting device to one of said pair of side gears.

10. The method of claim 5, wherein the step of coupling a rotatable portion of a differential to a torque supply source and the step of coupling an electronically controllable magnetorheological fluid-based torque limiting device to said differential comprises the steps of:

coupling a drive pinion gear to said torque supply source;

coupling a ring gear to said drive pinion gear;

coupling a differential casing to said ring gear;

coupling a differential pinion gear to said differential casing;

coupling a pair of side gears to said differential pinion gear;

coupling a first electronically controllable magnetorheological fluid-based torque limiting device to one of said pair of side gears; and coupling a second electronically controllable magnetorheological fluid-based torque limiting device to the other of said pair of side gears.

11. The method of claim 6, wherein the step of electronically actuating an electrical coil contained within said electronically controllable magnetorheological fluid-based torque limiting device to create a magnetic field comprises the step of supplying an electrical coil with an electrical current, wherein the flow of said electrical current through said electrical coil induces a magnetic field around said electrical coil, wherein said electrical coil is couples to a portion of a capillary tube, said capillary tube coupled to said fluid inlet and said fluid outlet.

12. The method of claim 11, wherein the amount of said electrical current supplied to said electrical coil is controlled by an electronic control unit as a function of a desired rotational speed of the output source relative to an input rotational speed of the torque supply source, wherein said amount of said electrical current is proportional to said amount of magnetic field.

13. The method of claim 12, wherein the amount of said electrical current supplied to said electrical coil is controlled by an electronic control unit as a function of an input rotational speed of said torque supply source, a desired rotational speed of the output source, the location of said electrical coil relative to said pump, said amount and the chemical composition of said magnetorheological fluid, the size of said pump, and the efficiency of said flow rate through said pump.

14. A method for controlling torque transfer from an input source to a wheel assembly through a differential assembly during a turning or to prevent a spin-out condition, the method comprising the steps of:

coupling an electronically controllable magnetorheological fluid-based closed pump system having an electronic control unit to a first component of the differential assembly; and controlling the rotation of a first component of the differential assembly by activating said electronically controllable magnetorheological fluid-based closed pump system.

15. The method of claim 14, wherein the step of coupling an electronically controllable magnetorheological fluid-based closed pump system comprises the step of coupling an electronically controllable magnetorheological fluid-based closed pump system having an electronic control unit to a first component of the differential assembly, wherein said first component is selected from the group consisting of a differential pinion gear and at least one of a pair of side gears.

16. The method of claim 14, further comprising the step of coupling a second electronically controllable magnetorheological fluid-based closed pump system coupled to said electronic control unit to a side gear of the differential assembly, wherein said first component comprises a differential pinion gear.

17. The method of claim 16, wherein the step of controlling the rotation of a first component of the differential assembly comprises introducing a first amount of current to said electronically controllable magnetorheological fluid-based closed pump system, wherein the introduction of said first amount of current is controlled by said electronic control unit as a function of a desired rotational speed of the wheel assembly relative to the rotational speed of the input source during a turning condition or to prevent a spin-out condition and as a function of the flow efficiency of a pump of said electronically controllable magnetorheological fluid-based closed pump system at said first amount of current.

* * * * *